April 17, 1956  H. M. KNOTH  2,741,891
COTTON PICKER DOFFER
Filed Feb. 9, 1954  2 Sheets-Sheet 1
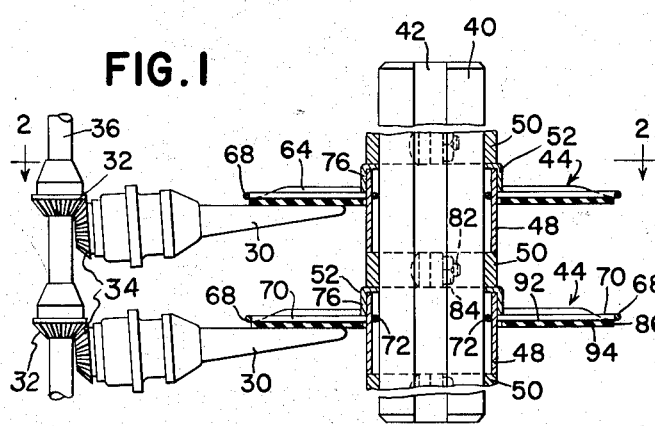
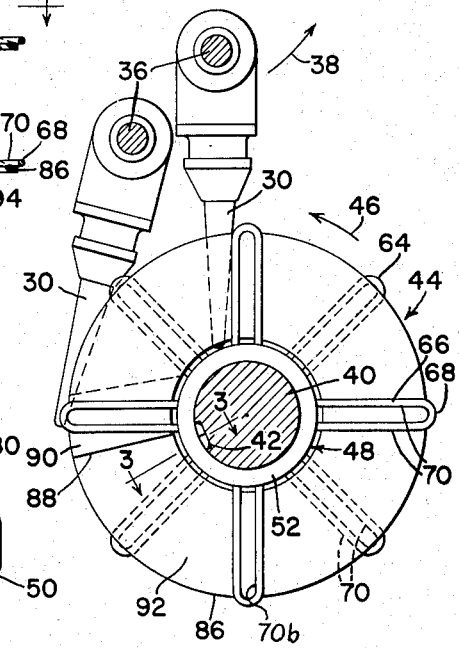
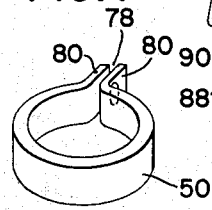
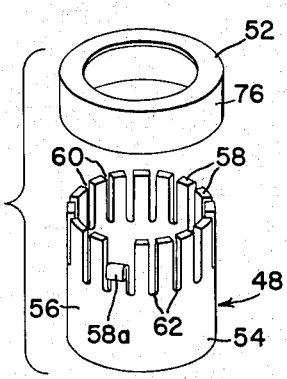
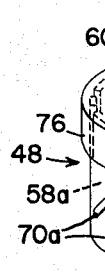
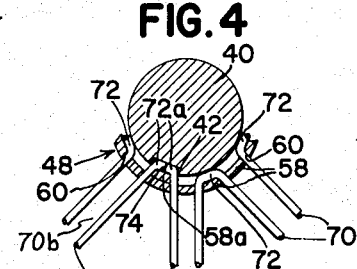
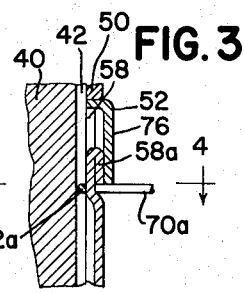
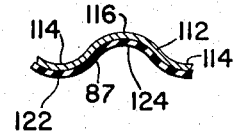
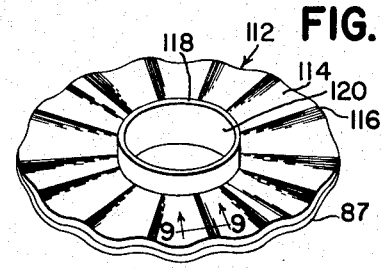
INVENTOR.

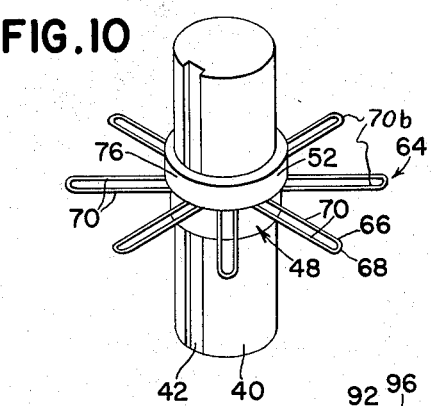
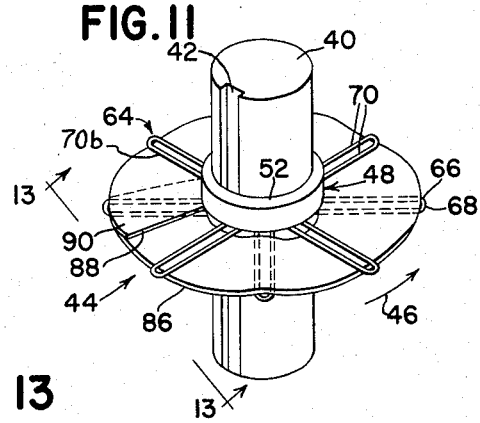
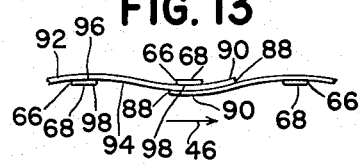
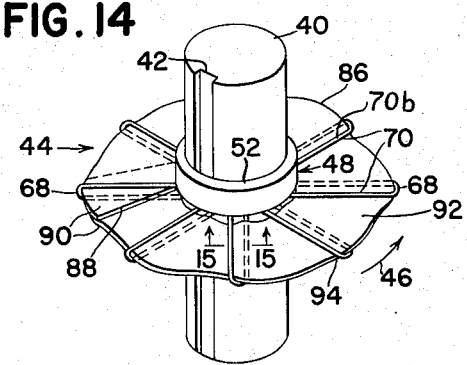
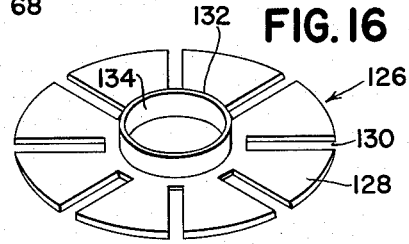
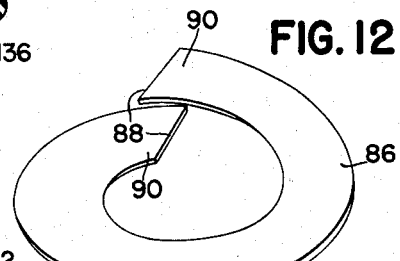
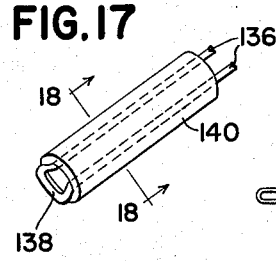
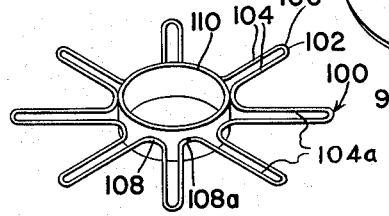
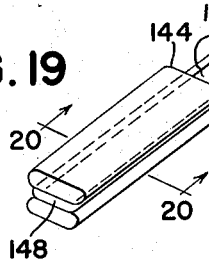
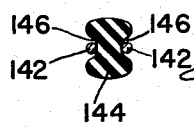
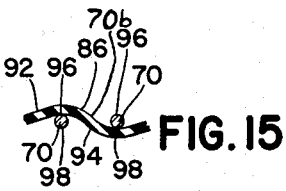

United States Patent Office 2,741,891
Patented Apr. 17, 1956

2,741,891

COTTON PICKER DOFFER

Harold M. Knoth, Davenport, Iowa, assignor to Deere & Company, Moline, Ill., a corporation of Illinois Application February 9, 1954, Serial No. 409,126

19 Claims. (Cl. 56—41)

This invention relates to a doffer for a cotton picker and more particularly to an improved and inexpensive doffer having as one of its primary characteristics easy replacement after a relatively efficient life.

The conventional cotton picker includes a picking drum made up of a plurality of upright picker bars from each of which project a series of rotating spindles adapted to enter and retract from the cotton plants to pick ripe cotton therefrom. As the spindles move in their respective orbits, they are caused to pass through doffing mechanism comprising a vertical series of horizontally rotating disks or equivalent members which operate to wipe or doff the cotton from the spindles. Because of the constant rubbing or doffing action to which the doffers are subjected, they ultimately wear out and must be replaced. It often happens that because of a bent spindle or other obstacle, a portion of one of the doffers may be broken off or otherwise damaged, necessitating replacement before the useful life of the doffer has expired. Because of the arrangement of the doffers in a series on a single shaft, replacement presents quite a problem, it being necessary to disassemble the entire doffing mechanism to remove and replace the damaged doffer or doffers. Since the doffers seldom wear out uniformly and simultaneously, the task of maintaining the doffing assembly at peak efficiency is one entailing relatively constant surveillance and replacement of the individual doffers as they become worn or damaged. Consequently, a great deal of engineering effort has been devoted to the design of doffing mechanism that will eliminate or at least minimize these problems in one way or another. Efforts have been made to provide expensive doffers having extremely long lives, but even these become damaged in a period far less than their expected usefulness and replacement is necessary. On the other hand, efforts have been directed toward the provision of relatively inexpensive doffers that need not be resurfaced but which can be thrown away and replaced as a unit. The present invention is directed toward improvements in the latter mentioned type of doffer.

One of the more significant objects of the present invention is to provide an improved doffer of simple and inexpensive construction having improved doffing means thereon in the form of a continuous corrugated or annular sinuous doffing surface. It is another object to provide an improved carrier for accommodating the corrugated or sinuous doffer member, this carrier member taking many forms, among which are a corrugated plate-like carrier, a slit plate carrier and a wire frame carrier.

A further object of the invention is to provide a novel wire frame carrier for a doffer, the carrier comprising a continuous one-piece wire frame so constructed as to include a plurality of radially elongated loops radiating from a central hub means in spoke-like fashion. The wire frame features the ability to carry several types of doffer means, including the corrugated or sinuous doffer member mentioned above and in addition different forms of doffer elements, principally in the form of block inserts or slip-on tubular elements.

A still further significant object of the invention is the provision of a releasable doffer construction in which the doffer may be removed from an installed on the doffer shaft as an individual assembly without removing the other doffers. In this respect, the invention features a novel doffer hub construction having releasable hub parts for normally retaining the releasable doffer but capable upon deliberate release for releasing the doffer so that it may be removed individually in a direction radially of the shaft. For this purpose, the doffer is radially split so that it may be circumferentially opened to clear the shaft and the hub means.

Still another object of the invention is to provide an improved doffer carrier in which the sinuous doffer element is removably carried on the carrier by means of being interlaced through a plurality of radial arm-like elements or spokes.

The foregoing and other important objects and desirable features inherent in the invention will become apparent as several forms of the invention are disclosed in detail in the accompanying specification and drawings, the several figures of which will be described immediately below.

Fig. 1 is a fragmentary elevational view, partly in section, showing the relationship between cotton picker spindle structure and cotton picker doffer structure.

Fig. 2 is a plan view of the structure seen in Fig. 1, partly in section, as viewed along the line 2—2 of Fig. 1.

Fig. 3 is a fragmentary sectional view on an enlarged scale as seen along the line 3—3 of Fig. 2.

Fig. 4 is a fragmentary transverse sectional view as seen along the line 4—4 of Fig. 3.

Fig. 5 is an exploded view showing the component parts of one of the hub assemblies.

Fig. 6 is a similar view, showing the hub parts assembled and the manner in which part of the wire frame doffer carrier is retained.

Fig. 7 is a perspective view of one of the collars used in association with a series of the hubs of Fig. 6.

Fig. 8 is a doffer comprising a corrugated plate carrying a corrugated or sinuous doffer member.

Fig. 9 is an enlarged fragmentary sectional view as seen along the line 9—9 of Fig. 8.

Fig. 10 is a perspective view showing one form of the wire frame and its hub as mounted on a doffer shaft.

Fig. 11 is a view similar to Fig. 10 but showing the wire frame carrying an annular doffing member.

Fig. 12 is a view of one form of doffing member by itself.

Fig. 13 is an enlarged fragmentary elevational view as seen along the line 13—13 of Fig. 11.

Fig. 14 is a view similar to Fig. 10 but showing the annular doffer member of Fig. 12 interlaced in the wire frame in a manner different from that in Fig. 11.

Fig. 15 is an enlarged fragmentary sectional view as seen along the line 15—15 of Fig. 14.

Fig. 16 is a view of a doffer carrier comprising a slit plate.

Fig. 17 is a view of one form of individual doffing element that can be mounted on a modified form of one of the elongated loops of the wire frame of Fig. 10.

Fig. 18 is a transverse sectional view as seen along the line 18—18 of Fig. 17.

Fig. 19 is a perspective view of an individual doffing element in the form of a block retained by one of the elongated loops of the wire frame of Fig. 10.

Fig. 20 is a transverse sectional view as seen along the line 20—20 of Fig. 19.

Fig. 21 is a view of a modified form of doffer comprising a wire frame rigidly united with a central hub.

Reference will be had first to Figs. 1 and 2 for a general orientation of the doffer structure as related to the cotton picker structure. Various details are omitted in the interests of brevity. These are well known to those skilled in the art and need not be repeated here. Suffice it to say that the over-all structure is very similar to that shown in the U. S. patent to Paradise 2,660,852, wherein it is shown that cotton picker spindles move through orbits and in this orbit is included a picking phase and a doffing phase, the spindles in the doffing phase moving through associated doffers that are effective to wipe or doff the cotton lengthwise of the spindles. A pair of such spindles are shown in the present case in Fig. 1 and each is designated by the numeral 30. The inner end of each spindle is driven by a pair of meshing bevel pinions 32 and 34, the latter being keyed to an upright spindle-driving shaft 36.

As the spindles move through the doffing phase of their orbit, they travel generally in the direction of the arrow 38 (Fig. 2) and, while in this doffing phase, are doffed by the doffing means. As shown here, the doffing means comprises an upright central supporting shaft 40 having a keyway 42 by means of which a plurality or vertical series of doffers 44 are driven to rotate in the direction of the arrow 46 (Fig. 2). It will be understood that there are as many doffers 44 as there are sets of spindles 30 and that the individual doffers are effective to wipe or doff the cotton from the individual spindles.

The doffing assembly further includes a plurality of alternated hubs 48 and collars 50, these being coaxially arranged on the shaft 40 in such manner that each hub is separated from its neighbor by an intervening collar and the hubs and collars respectively abut each other to prevent relative axial movement thereof on the shaft. The particular hub assembly referred to in connection with Figs. 1 and 2 is shown in disassembled relationship in Fig. 5 and in assembled relationship in Fig. 6, from which it will be seen that each hub comprises first and second parts 52 and 54. The lower part comprises a ring-like or cylindrical base portion 56 adapted to loosely embrace the shaft 40 and having projecting axially upwardly therefrom a plurality of tangs or fingers 58, the structure being such as to leave between the fingers an equal number of axial slots 60, each slot terminating or being closed at its bottom as at 62.

The doffer 44 associated with the hub 48 may be of the type shown in Fig. 10, from which it will be seen that the doffer comprises a basic rotary member or doffer carrier 64 having central means having as its axis of rotation the axis of the shaft 40 and made up by the hub 48 and outer means made up of doffer-member supports in the form of a plurality of radially outwardly projecting arm-like elements or spokes 66 uniformly circumferentially spaced about the hub means 48 and presenting an upper or obverse side and a lower or reverse side. The arm-like elements 66 are part of a wire frame, as shown generally in Fig. 10, each arm-like element comprising an elongated loop having a radially outer closed or terminal end in the form of a short circumferential bight 68 and a pair of closely circumferentially spaced parallel legs 70, each pair defining a radial slot 70b. As see in Fig. 4, the legs 70 adjoin each other at their inner ends in inner bights 72, and the wire, which may be of any appropriate material, is of one piece, certain of the legs, as those indicated at 70a in Fig. 4, having proximate bight portions 72a abutting at and defining a radial split 74. Consequently, the bights 72, 72a constitute central hub-engageable portions and the fingers 58 and slots 60 on the lower hub part 54 constitute cooperative doffer-member-engaging portions normally interengaged when the associated hub parts 54 and 52 are assembled as in Fig. 6. With the hub parts 52 and 54 already on and encircling the shaft, but axially separated, it is a simple matter to spring the wire frame apart at the split or joint 74 so that the circumferential opening thus provided is enough to permit the doffer to embrace the shaft and hub, the inner bights 72 being slipped over the respective alternate fingers 58 and moved downwardly to the bottoms 62 of the slots 60. It is preferred that the bight portions 72a bordering on the now closed split or joint 72 be disposed in the shaft keyway 42. One of the fingers 58 of the hub 48, as at 58a (Figs. 3, 4, 5 and 6), is of double thickness and thereupon comprises a portion engaging the respective inner bight 72a for radially displacing the bight portions 72a inwardly and into the keyway 42 when the cap 52 is installed, as will be presently described. Thus, the bight portions 72a constitute means on one of the arm-like elements 66 that project radially inwardly through the side opening formed by the associated slot 60 so as to enter the interior of the hub, which is of tubular construction, as already noted, to provide a driving key cooperative with the keyway 42 of the shaft 40.

Before the wire frame is assembled into the hub lower part 54, one of the collars 50 will have been removed to permit axial separation of the upper and lower hub parts, which thereupon permits ready assembly of the wire frame in the manner just described. After the legs 70 and 70a of the wire frame are received and seated in the slots, the cap 52 is moved downwardly, the cap 52 having a depending annular flange 76 which tightly embraces the upper portions of the fingers 58. That portion of the flange 76 that engages the doubled finger 58a forces the doubled portion inwardly to displace the bight portions 72a into the keyway 42.

The now assembled hub 48 is held against axial separation by reinstallation of the collar 50. This collar is best shown in Fig. 7 as comprising a one-piece ring having therein a radial split bordered or defined by a pair of radially extending apertured ears 80. These ears are normally maintained together by releasable means such as a bolt 82 and nut 84 (Fig. 1), thus affording the collar a continuous ring-like form. However, the bolt and nut may be removed to allow the collar to be circumferentially spread or sprung so that it may be radially removed from the shaft 40. What is involved is simply that the collar 50 occupies the space between neighboring hubs 48 and when in place keeps the hubs against axial movement relative to each other and further prevents axial separation of the hub parts 52 and 54. However, when the collar is released, sufficient axial space is provided to enable separation of the hub parts and consequently the wire frame carrying a damaged doffer may be readily removed and discarded and replaced by another.

Fig. 12 shows one form of ring-like doffer member, preferably of elastomer or other suitable material, that may be used with the wire frame doffer carrier 64 of the figures just described. This ring-like doffer member is designated generally by the numeral 86, split at 88 to provide proximate portions 90. As shown in Figs. 11 and 13 the ring-like member 86 may be interlaced or interweaved with the arm-like elements 66 of the doffer carrier 64, passing alternately under and over the arm-like elements 66. The ring-like member is made preferably circumferentially longer than is necessary so that the portions 90 at the radial split 88 may overlap, as best shown in Fig. 13, the overlap preferably being such that the trailing portion 90 is lowermost, in which case it will form no obstruction to travel of the doffer as represented by the arrow bearing the numeral 46.

Figs. 14 and 15 show another mounting for the ring 86, in this case the ring being interlaced or interweaved through the radial slots 70b provided by the spaced legs 70 of the arm-like elements 66. In either case, the ring 86, having an upper or obverse face 92 and a lower or reverse face 94, presents its reverse face as a corrugated or annular sinuous doffing surface, the top portions of the legs 70 and 70a representing obverse radially extending portions 96 and the lower or under portions representing radially extending reverse portions 98. The overlap of the portions 90 at the split 88 is as in Fig. 13.

The characteristics of the wire frame carrier 64 may be utilized with a different form of hub means, as in Fig. 21, wherein the numeral 100 designates the modified carrier which has arm-like radial elements or doffer-member supports 102 forming radial legs 104 closed at their outer ends as by bights 106, to provide slots 104a, and closed at their inner ends as by bights 108, the wire frame before being welded to a central tubular hub 110 being split at 108a in one of its bights 108. The tubular hub 110 may be a suitable ring to which the wire frame 100 is affixed as by welding at the locations established by contact between the inner bights 108 and the outer surface of the hub 110. In this case, however, the wire frame is not individually removable from the shaft, as is the wire frame of the doffer assembly of Figs. 1, 2, 10, 11 and 14, for example. Nevertheless, the doffer frame 100 retains the advantage of simple and economic construction and if it needs replacement, it can be readily replaced and economically thrown away.

The wire frame 100 of Fig. 21 can, of course, carry the ring-like doffer member 86 of Fig. 12, which is deemed to be obvious and therefore to require no additional illustration.

The corrugated or sinuous doffing surface feature may be carried out by the mounting of the annular doffing member 86, or its equivalent, on a corrugated plate or carrier 112 as shown in Figs. 8 and 9. In this case, the plate has outer means in the form of alternate concave and convex radial corrugations 114 and 116 respectively and central means in the form of a hub 118 of tubular construction so as to afford a shaft-receiving opening 120. The plate 112 has, of course, opposite obverse and reverse sides and the concave corrugations 114, even though webbed together by the convex portion, may be considered as providing a first set of radial arm-like elements or doffer-member supports which, like the arm-like elements 66 of the doffer 44, have reverse portions lying in a common plane normal to the axis of the shaft 42. Since the corrugated plate 112 is circular, the radial outer ends of these arm-like elements will lie on a circle having as its center the axis of the shaft opening 120. The convex corrugated portions 116 provide a second set of radial arm-like elements, the obverse and reverse portions of which obviously lie in a plane spaced in an obverse direction from the plane in which lie the reverse portions of the concave corrugations. When a doffer ring 87, like the doffer ring 86 or its equivalent, is affixed to the carrier or corrugated plate 112, it follows the corrugations as shown in Fig. 9, circumferentially spaced portions 122 of the ring 87 coinciding respectively with the concave corrugations and other circumferentially spaced portions 124 of the ring 87 coinciding respectively with the convex corrugations 116 of the carrier 112. Affixation of the ring 87 to the corrugated plate 112 may be accomplished by bonding, vulcanizing, etc., depending upon the material of which the ring 87 is constructed. Of course, if the ring 86 is used, the circular length thereof will be appreciably shorter than that shown in Fig. 12, since it will not be necessary to have the overlap at 88 and 90.

Fig. 16 represents another form of carrier or rotary member, designated generally by the numeral 126. This member has alternate arm-like elements 128 spaced circumferentially apart so as to provide alternate slots 130, into which the member 86 may be interlaced in an obvious manner. The outer portion of the member 126 consists of the arm-like elements 28 and the slots 130 and the member has an inner or central portion providing a hub 132 which is of tubular construction so as to provide a shaft-receiving opening 134. This member has certain obvious characteristics of the member 64, for example, except that it does not have the hub structure 48 and consequently cannot be removed radially and individually from the doffer shaft 40. Nevertheless, when the member 86 is mounted thereon, it contributes to the provision of the corrugated or sinuous doffer surface common to the doffer members previously described.

Figs. 17 through 20 represent modifications of the structure of Figs. 10 and 21, for example, in which the arm-like elements, 66 in the case of Fig. 10 and 102 in the case of Fig. 21, carry individual doffing means. In Fig. 17, the numeral 136 represents a pair of legs on a rotary member such as described. These legs terminate at their outer ends in a joining bight 138 which is shaped as shown to contribute to the retention on the legs 136 of a doffing member in the form of a tube 140 of any appropriate material, which may be a short length of hose of appropriate size. Fig. 18 shows that the tube, originally circular, is ovalized when installed on the legs 136, which thereby adds to the self-retaining feature of the structure. It will be understood, of course, that the doffing member on which the legs 136 are provided will have a plurality of such legs, these legs being arranged as already suggested in the manner of Fig. 10 or 21.

In Figs. 19 and 20, the numeral 142 represents legs comparable to the legs 70 of the rotary members of Figs. 10 and 21, for example, it again being understood that there are several pairs of such legs so as to provide a rotary doffing member. In the case of Figs. 19 and 20, the doffing means comprises a plurality of doffing blocks 144, only one of which is shown but the remainder of which will be obvious, having at its opposite sides grooves 146 respectively received by the legs 142. The legs 142 at their outer ends terminate in a bight 148 and between them provide a slot 142a. The block 144 is retained in this slot between the legs and there is a gripping relationship between the legs and the grooved sides of the block. Moreover, the bight 148 prevents radially outward displacement of the block relative to the legs.

In the forms of the invention relating to the provision of the corrugated or sinuous doffing surface, a simply constructed and relatively inexpensive doffer is provided. In any of the forms of the invention except Figs. 8 and 9, the ring-like doffing member 86 is readily removable from the carriers, be the carrier that of Figs. 10, 16 or 21. The hub structure 48, emphasized particularly in Figs. 1 through 7 and also characterizing Figs. 10 through 14, enables radial and individual removal of the wire frame doffer carrier. Apart from the novel hub structure, the wire frame structure is important as contributing to the ease and economy with which the doffer may be manufactured. Also, the wire frame, being constructed of appropriate steel wire or the like, presents the resilient arm-like elements which are adapted to carry either the doffing means of Fig. 12, those of Figs. 17 through 20 and others that will immediately suggest themselves on the basis of the present disclosure.

Various other features and objects of the invention, other than those specifically enumerated herein, will undoubtedly occur to those versed in the art, as will many modifications and alterations in the disclosure, all of which may be achieved without departing from the spirit and scope of the invention.

What is claimed is:

1. A cotton picker doffer, comprising: a rotary doffer carrier including central means having a shaft-receiving opening and further including outer means concentric with the central means and having radial arm-like elements projecting outwardly from the central means in uniformly circumferentially spaced relationship and of uniform radial length so that the radially outer terminal ends thereof lie on a circle having the axis of the central means as its center, each arm-like element having a radially extending obverse portion and a radially extending reverse portion and said elements being arranged to dispose said reverse portions in a plane normal to the axis of the central means; and a one-piece ring-like doffer member, of substantially uniform axial thickness throughout its circumferential extent, positioned concentrically with the rotary carrier and having a central opening concentric with the central means of said rotary carrier, said doffer member having an outer periphery substantially coincident with the circle on which lie the outer ends of the arm-like elements and further having obverse and reverse faces, being supported on the rotary carrier by mounting of circumferentially spaced portions of its obverse face to the reverse portions of the arm-like elements, with other circumferentially spaced portions of said doffer member displaced respectively between said arm-like elements in the obverse direction to present its reverse face as an annular sinuous doffing surface having radial corrugations spaced circumferentially according to the circumferential spacing of the arm-like elements.

2. The invention defined in claim 1, in which: the arm-like elements radiate from the central means in spoke-like fashion, leaving spaces respectively therebetween; and the doffer member is annularly interweaved alternately over and under said elements.

3. The invention defined in claim 1, in which: each of the arm-like elements has a radial slot therein; and the doffer member is annularly interweaved through said slots and alternately over and under said elements.

4. The invention defined in claim 1, in which: each of the arm-like elements is in the form of a radially elongated loop having a bight at its outer terminal end and a pair of circumferentially spaced legs joined to the bight and extending radially from said bight to the central means; and the doffer member is annularly interweaved alternately over and under said legs and just radially inwardly of the bights.

5. The invention defined in claim 1, in which: each of the arm-like elements is in the form of a radially elongated loop having a bight at its outer terminal end and a pair of circumferentially spaced legs joined to the bight and extending radially from said bight to the central means to provide a radial slot; and the doffer member is annularly interweaved alternately over and under the legs and through the slots just radially inwardly of the bights.

6. A cotton picker doffer, comprising: a rotary carrier including central means having a shaft-receiving opening and further including outer means concentric with the central means and having obverse and reverse sides, said rotary carrier outer means consisting of a corrugated circular plate having alternate concave and covex radial corrugations, said concave corrugations providing a first set of radial arm-like elements projecting from the central means in uniformly circumferentially spaced relationship and respectively having radially outer terminal ends lying on a circle having the axis of the central means as its center, each arm-like element having a radially extending obverse portion and a radially extending reverse portion and said elements being arranged to dispose said reverse portions in a plane normal to the axis of the central means; and said convex corrugations providing a second set of arm-like radial elements respectively alternating with those of the first set and respectively having obverse and reverse portions displaced in an obverse direction from said plane of the reverse portions of the arm-like elements in the first set; and a one-piece ring-like doffer member, of substantially uniform axial thickness throughout its circumferential extent, positioned at the reverse side of the rotary carrier and having a central opening concentric with the central means of said rotary carrier, said doffer member having an outer periphery substantially coincident with the circle on which lie the outer ends of the arm-like elements and further having obverse and reverse faces, being mounted on the rotary carrier by affixation of circumferentially spaced portions of its obverse face to the reverse portions of the first set of arm-like elements, with other circumferentially spaced portions thereof displaced respectively between said arm-like elements in the obverse direction and affixed to the reverse portions of the second set of arm-like elements to present its reverse face as an annular sinuous doffing surface having radial corrugations spaced circumferentially according to the circumferential spacing of the arm-like elements.

7. In a cotton picker doffer: a rotary doffer-supporting carrier comprising central means having a shaft-receiving opening and further including outer means concentric with the central means and consisting of a wire frame having radial arm-like elements joined to and projecting from the central means in uniformly circumferentially spaced relation and respectively having radially outer ends lying on a circle having the axis of the central means as its center, each element comprising a radially elongated wire loop provided with a bight at its outer end and a pair of circumferentially closely spaced legs joined to the bight and extending radially inwardly to the central means.

8. The invention defined in claim 7, in which: the central means includes a tubular hub having the shaft receiving opening, and the element legs have radially inner ends affixed to the hub.

9. The invention defined in claim 8, in which: the inner end of each leg adjoins the inner end of its neighboring leg in an inner bight to provide a series of circumferentially spaced hub-encircling inner bights and said inner bights are affixed to the hub.

10. The invention defined in claim 9, in which: the hub has a cylindrical base portion and a plurality of axially extending fingers equal in number and spaced circumferentially according to the legs, said fingers respectively having slots therebetween extending axially from said annual portion, and said inner bights respectively hook over and radially inwardly of said fingers with the inner portions of the legs received respectively in the slots and bottoming on said base portion respectively between the fingers.

11. The invention defined in claim 10, in which: the hub has a separate retaining ring encircling the fingers above the inner portions of the legs to retain the legs against axial escape from said slots.

12. The invention defined in claim 7, in which: the central means includes a tubular hub affording the shaft-receiving opening, the element legs have radially inner ends affixed to the hub, the hub has a side opening therein, and the inner end of at least one arm-like element projects radially inwardly through said side opening and into the interior of the hub to provide a driving key.

13. The invention defined in claim 7, in which: the central means includes a tubular hub affording the shaft-receiving opening and said hub has an annular wall provided with axially extending fingers equal in number and circumferentially spaced according to the legs, said fingers respectively having therebetween axial slots closed at their bottoms; the inner end of each leg adjoins the inner end of its neighboring leg in an inner bight to provide a series of circumferentially spaced inner bights concentrically disposed as respects the hub, said inner bights being hooked over and radially inwardly of the respective hub fingers, with the inner portions of the legs seating in the bottoms of the slots; the hub has a separate retaining ring encircling the fingers above the inner portions of the legs to retain the legs against axial escape from said slots; and at least one of the hub fingers has a portion thereon engaging the respective inner bight and another portion thereon engaged by and radially inwardly displaced by the retaining ring to displace said respective inner bight radially into the interior of the hub as a driving key.

14. A cotton picker doffer assembly, comprising: a central supporting shaft; a plurality of alternate hubs and collars coaxial on and carried by the shaft; each hub being separated from its neighbor by an intervening collar and said hubs and collars respectively abutting each other to prevent relative axial movement thereof; each hub including first and second axially separable parts normally held against axial separation by the adjacent collar; a plurality of doffer carriers, one for and encircling each hub; each doffer carrier having central hub-engageable portions and at least one part of each hub having cooperative doffer-carrier-engaging portions normally interengaged when the associated hub parts are held against axial separation by the adjacent collar; at least one of the collars having releasable shaft-embracing portions normally embracing the shaft but releasable to enable separation of the collar and radial removal thereof from the shaft so as to provide an axial space between neighboring hubs whereby the first part of one hub may be axially separated from the second part of said one hub and thus to disengage the associated doffer carrier and hub part portions; and said doffer carrier being radially split to enable circumferential opening of said carrier sufficient to clear its hub-engageable portions from the separated hub parts so as to be individually radially removable from the doffer assembly.

15. A cotton picker doffer assembly, comprising: a central supporting shaft; a plurality of coaxial hubs carried by said shaft, each hub including cooperative, selectively lockable and releasable parts; a plurality of coaxial doffer carriers, one for and encircling each hub, each doffer carrier having a hub-embracing portion receivable and engaged by the parts of the associated hub when said parts are locked and releasable when said parts are released; and said doffer carrier being radially split to enable circumferential opening of said carrier sufficient to clear the hub when the hub parts are released so as to be individually radially removable from the doffer assembly.

16. The invention defined in claim 15, in which: the doffer carrier has a one-piece carrier of endless annular construction except for said radial split, said carrier having terminal portions at each side of and defining said radial split; and the hub parts are operative when locked to retain said terminal portions against opening at said radial split.

17. A cotton picker doffer, comprising: a rotary doffer-carrier including central means having a shaft-receiving opening and further including outer means concentric with the central means, said outer means consisting of a wire frame having radial arm-like elements joined to and projecting from the central means in uniformly circumferentially spaced relation and respectively having radially outer ends lying on a circle having the axis of the central means as its center, each element including a radially elongated loop provided with a bight at its outer end and a pair of circumferentially closely spaced legs joined to the bight and extending radially inwardly to the central means; and doffing means carried by said arm-like elements.

18. A cotton picker doffer, comprising: a rotary doffer carrier including central means having a shaft-receiving opening and further including outer means concentric with the central means and having a plurality of uniformly, circumferentially spaced doffer-member supports radiating from the central means and of uniform radial length to dispose their radially outer terminal ends on a circle having the axis of the central means as its center, each support having an obverse portion and a reverse portion and said supports being arranged to dispose said reverse portions in a plane normal to the axis of the central means; and a one-piece ring-like doffer member, of substantially uniform axial thickness throughout its circumferential extent, positioned concentrically with the central means of said rotary carrier, said doffer member having an outer periphery substantially coincident with the circle on which lie the outer ends of the supports and further having obverse and reverse faces, being supported on the rotary carrier by mounting of circumferentially spaced portions of its obverse face to the reverse portions of the supports, with other circumferentially spaced portions thereof displaced respectively between said supports in the obverse direction to present its reverse face as an annular sinuous doffing surface having radial corrugations spaced circumferentially according to the circumferential spacing of the supports.

19. The invention defined in claim 18, in which: the outer means comprises a circular, radially corrugated plate having alternate obversely and reversely directed corrugations, said reversely directed corrugations affording the doffing member supports and said obversely directed corrugations affording means for respectively receiving the aforesaid obversely displaced, circumferentially spaced portions of the doffer member.

References Cited in the file of this patent

UNITED STATES PATENTS

| | | |
|---|---|---|
| 1,828,534 | Johnston et al. | Oct. 20, 1931 |
| 2,664,688 | Nickla | Jan. 5, 1954 |
| 2,670,585 | Hagen et al. | Mar. 2, 1954 |
| 2,699,027 | Hubbard | Jan. 11, 1955 |